(12) United States Patent
Wolberg et al.

(10) Patent No.: US 9,763,195 B2
(45) Date of Patent: Sep. 12, 2017

(54) DYNAMIC ENVELOPE ELIMINATION AND RESTORATION POLAR TRANSMITTER

(71) Applicant: APPLE INC., Cupertino, CA (US)

(72) Inventors: Dan Wolberg, Moshav Yanov (IL); Ofer Blonskey, Even Yehuda (IL)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 14/601,935

(22) Filed: Jan. 21, 2015

(65) Prior Publication Data
US 2017/0005854 A1   Jan. 5, 2017

(51) Int. Cl.
H04L 27/34 (2006.01)
H04W 52/02 (2009.01)
H04L 27/36 (2006.01)

(52) U.S. Cl.
CPC ..... *H04W 52/0287* (2013.01); *H04L 27/3405* (2013.01); *H04L 27/361* (2013.01); *H04L 27/3472* (2013.01); *Y02B 60/50* (2013.01)

(58) Field of Classification Search
CPC .......................... H04L 27/365; H04W 52/0287
See application file for complete search history.

(56) References Cited

U.S. PATENT DOCUMENTS

| | | | |
|---|---|---|---|
| 6,906,996 B2* | 6/2005 | Ballantyne | H04L 1/0003 370/204 |
| 7,180,384 B2* | 2/2007 | Efstathiou | H04L 27/362 332/106 |
| 7,474,708 B1* | 1/2009 | Khlat | H04B 1/707 375/296 |
| 7,570,707 B2 | 8/2009 | Jensen | |
| 8,059,748 B2* | 11/2011 | See | H03C 5/00 375/296 |
| 8,086,189 B2 | 12/2011 | Collados Asensio et al. | |
| 8,509,351 B1* | 8/2013 | Khlat | H03C 5/00 370/207 |
| 8,817,909 B2 | 8/2014 | Goe et al. | |
| 2007/0015472 A1* | 1/2007 | Murtojarvi | H03F 1/0261 455/102 |
| 2007/0018718 A1* | 1/2007 | Horng | H03F 1/0227 330/10 |
| 2007/0183531 A1* | 8/2007 | Ahmed | H03F 3/24 375/297 |
| 2007/0183532 A1 | 8/2007 | Matero | |
| 2007/0223625 A1* | 9/2007 | Rofougaran | H04B 1/0475 375/302 |
| 2009/0191825 A1* | 7/2009 | Georgantas | H04B 1/0483 455/102 |

(Continued)

FOREIGN PATENT DOCUMENTS

GB   2368214 A   4/2002

*Primary Examiner* — Kenneth Lam
(74) *Attorney, Agent, or Firm* — Fletcher Yoder PC (57) ABSTRACT

Devices and methods for increasing and maximizing power efficiency in polar and Cartesian transmitters are provided. By way of example, an electronic device includes a transmitter configured to receive an in-phase/quadrature (I/Q) signal, generate an amplitude envelope signal based on the I/Q signal, decompose the amplitude envelope signal into an envelope amplitude portion and an envelope phase portion, and to dynamically switch between performing a polar modulation of the I/Q signal and performing an I/Q modulation of the I/Q signal based at least in part on an amplitude value of the envelope phase portion.

24 Claims, 8 Drawing Sheets

(56) References Cited

U.S. PATENT DOCUMENTS

| | | | | |
|---|---|---|---|---|
| 2009/0311980 A1* | 12/2009 | Sjoland | ............... | H03F 1/0294 455/127.3 |
| 2012/0114075 A1* | 5/2012 | Shimada | ............... | H03F 1/0227 375/298 |
| 2013/0022150 A1* | 1/2013 | McCune, Jr. | ............... | H04L 27/20 375/298 |

* cited by examiner

DYNAMIC ENVELOPE ELIMINATION AND RESTORATION POLAR TRANSMITTER

BACKGROUND

The present disclosure relates generally to Cartesian and polar transmitters, and more particularly, to Cartesian and polar transmitters included within electronic devices.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Transmitters and receivers are commonly included in various electronic devices, and particularly, portable electronic devices such as, for examples, phones (e.g., mobile and cellular phones, cordless phones, personal assistance devices), computers (e.g., laptops, tablet computers), internet connectivity routers (e.g., Wi-Fi routers or modems), radios, televisions, or any of various other stationary or handheld devices. One type of transmitter, known as a wireless transmitter, may be used to generate a wireless signal to be transmitted by way of an antenna coupled to the transmitter. Specifically, the wireless transmitter is generally used to wirelessly communicate data over a network channel or other medium (e.g., air) to one or more receiving devices.

The wireless transmitters may generally include subcomponents such as, for example, an oscillator, a modulator, one or more filters, and a power amplifier. Furthermore certain data modulation techniques that may be implemented by wireless transmitters may include a modulation of in-phase (I)/quadrature (Q) time samples of a signal into amplitude and phase signals. However, because the modulation from the I/Q samples to the amplitude and phase signals may be based on a nonlinear function, the amplitude and phase may include a very wide bandwidth (e.g., infinite bandwidth), and may thus include a number of nonlinearities or distortions upon completion of the modulation. Moreover, even when the amplitude and phase are filtered in an attempt to track the bandwidth or envelope of the amplitude and phase, the filtering may cause the amplitude and/or phase to no longer include a constant envelope, and to include undesirable spikes in amplitude at or near the zero crossing or zero value. These undesirable qualities may contribute to power efficiency losses in the wireless transmitters, and, by extension, may contribute to increased power consumption by the wireless transmitters. It may be useful to provide more advanced and improved wireless transmitters.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Various embodiments of the present disclosure may be useful in increasing and maximizing power efficiency in polar and Cartesian transmitters. By way of example, an electronic device includes a transmitter configured to receive an in-phase/quadrature (I/Q) signal, generate an amplitude envelope signal based on the I/Q signal, decompose the amplitude signal into an envelope amplitude portion and an envelope phase portion, and to dynamically switch between performing a polar modulation of the I/Q signal and performing an I/Q modulation of the I/Q signal based at least in part on an amplitude value of the envelope phase portion.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure relate to techniques for increasing and maximizing power efficiency in polar and Cartesian transmitters. For example, the present embodiments may include providing a dynamic Kahn envelope elimination and restoration (EER) polar transmitter, which may include a modulator (e.g., digital signal processor (DSP), coordinate rotation digital computer (CORDIC) processor) and a dynamic envelope splitter (e.g., DSP) that may be used to extract the information of an incoming in-phase/quadrature (I/Q) component signal, and to determine whether to perform an EER polar modulation of the incoming signal, an I/Q modulation of the incoming signal, or both in conjunction. Indeed, the dynamic envelope splitter may be useful in allowing the transmitter to dynamically switch the transmitter between operating as an EER polar transmitter operating as an I/Q transmitter based on amplitude envelop information (e.g., amplitude and/o phase information) of the incoming I/Q data signal extracted from the amplitude envelope generated by the polar modulator. In this way, the power efficiency of the transmitter in modulating data signals and/or carrier frequency signals may be markedly increased and maximized. Furthermore, the alignment between amplitude and phase path sensitivity and power amplifier input and output leakage may also be improved utilizing presently disclosed techniques.

Figure 1:
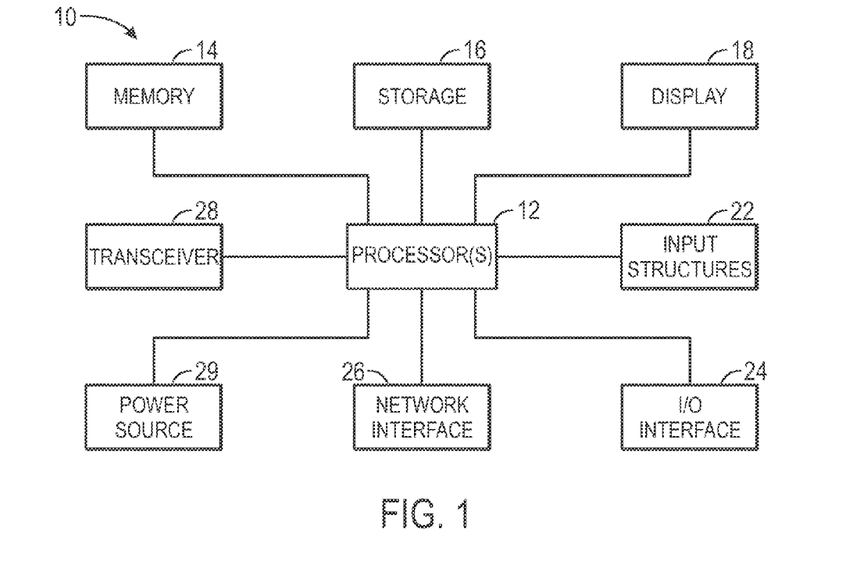
FIG. 1 is a schematic block diagram of an electronic device including a transceiver, in accordance with an embodiment.

With the foregoing in mind, a general description of suitable electronic devices that may employ polar and Cartesian transmitters and are useful in dynamically switching transmitters between operating as envelope elimination and restoration (EER) polar transmitters and in-phase/quadrature (I/Q) transmitters will be provided below. Turning first to FIG. 1, an electronic device 10 according to an embodiment of the present disclosure may include, among other things, one or more processor(s) 12, memory 14, nonvolatile storage 16, a display 18 input structures 22, an input/output (I/O) interface 24, network interfaces 26, a transceiver 28, and a power source 29. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
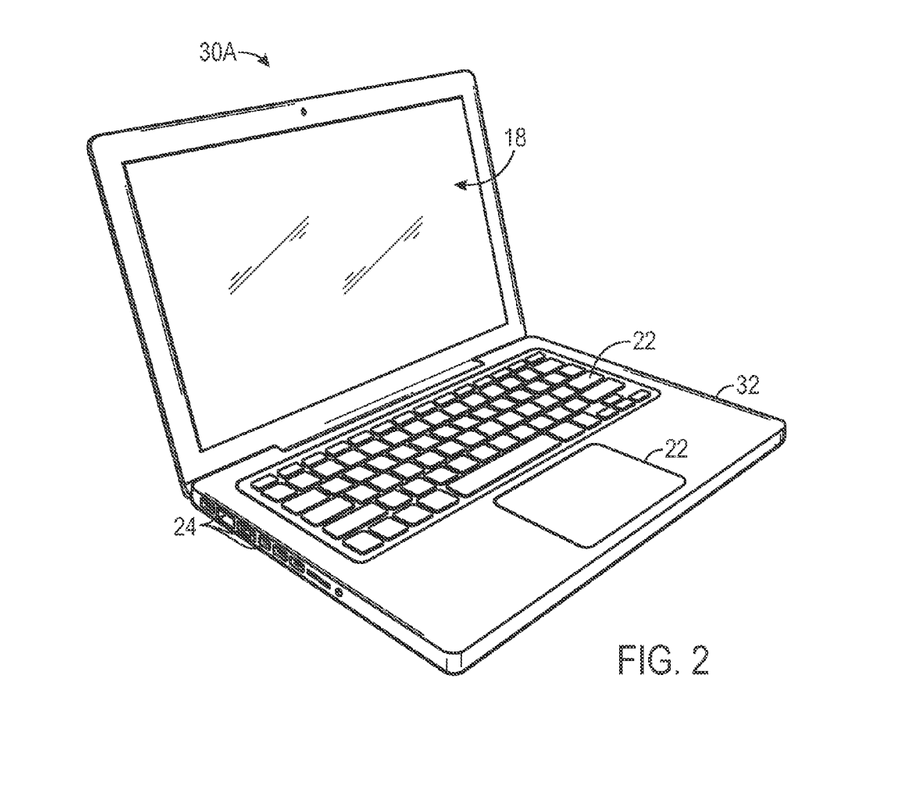
FIG. 2 is a perspective view of a notebook computer representing an embodiment of the electronic device of FIG. 1.
Figure 3:
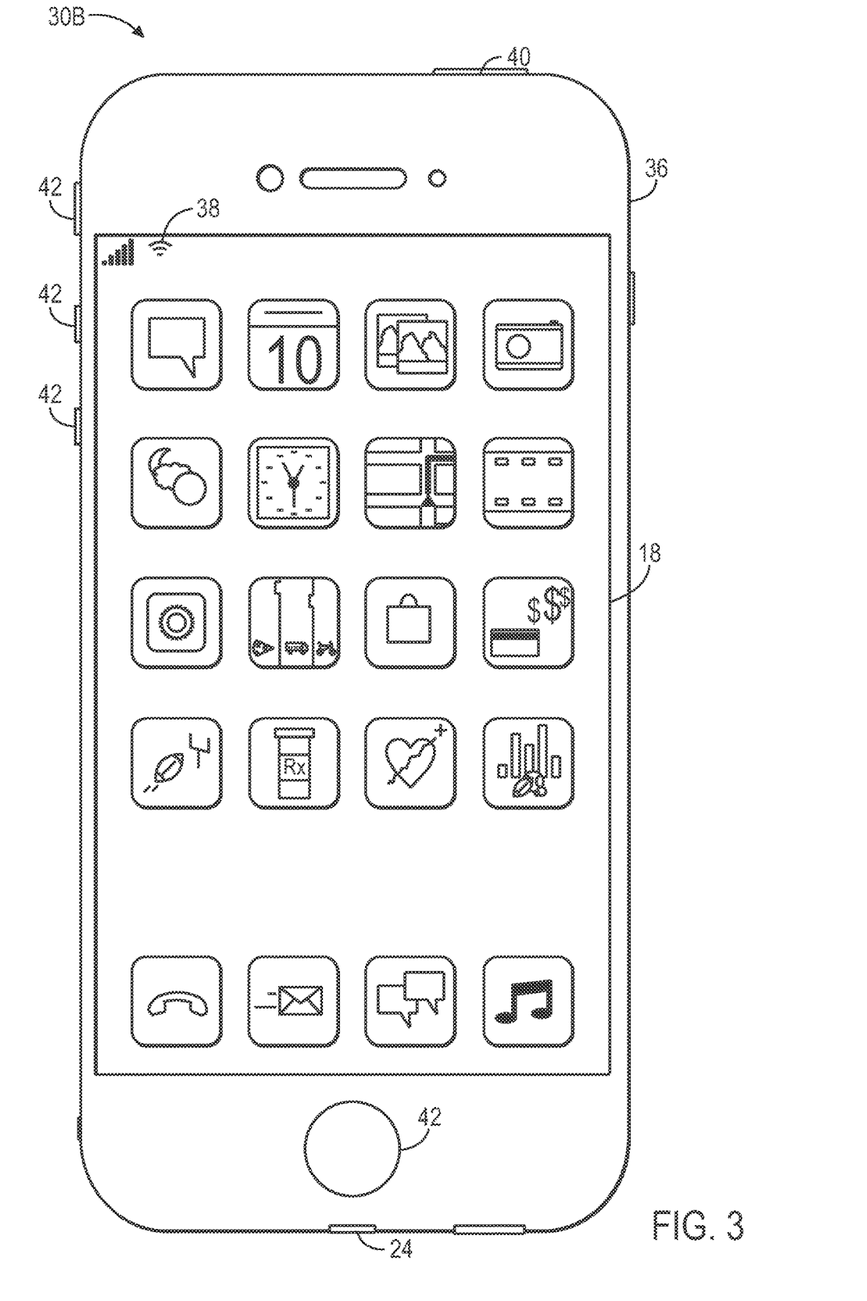
FIG. 3 is a front view of a hand-held device representing another embodiment of the electronic device of FIG. 1.
Figure 4:
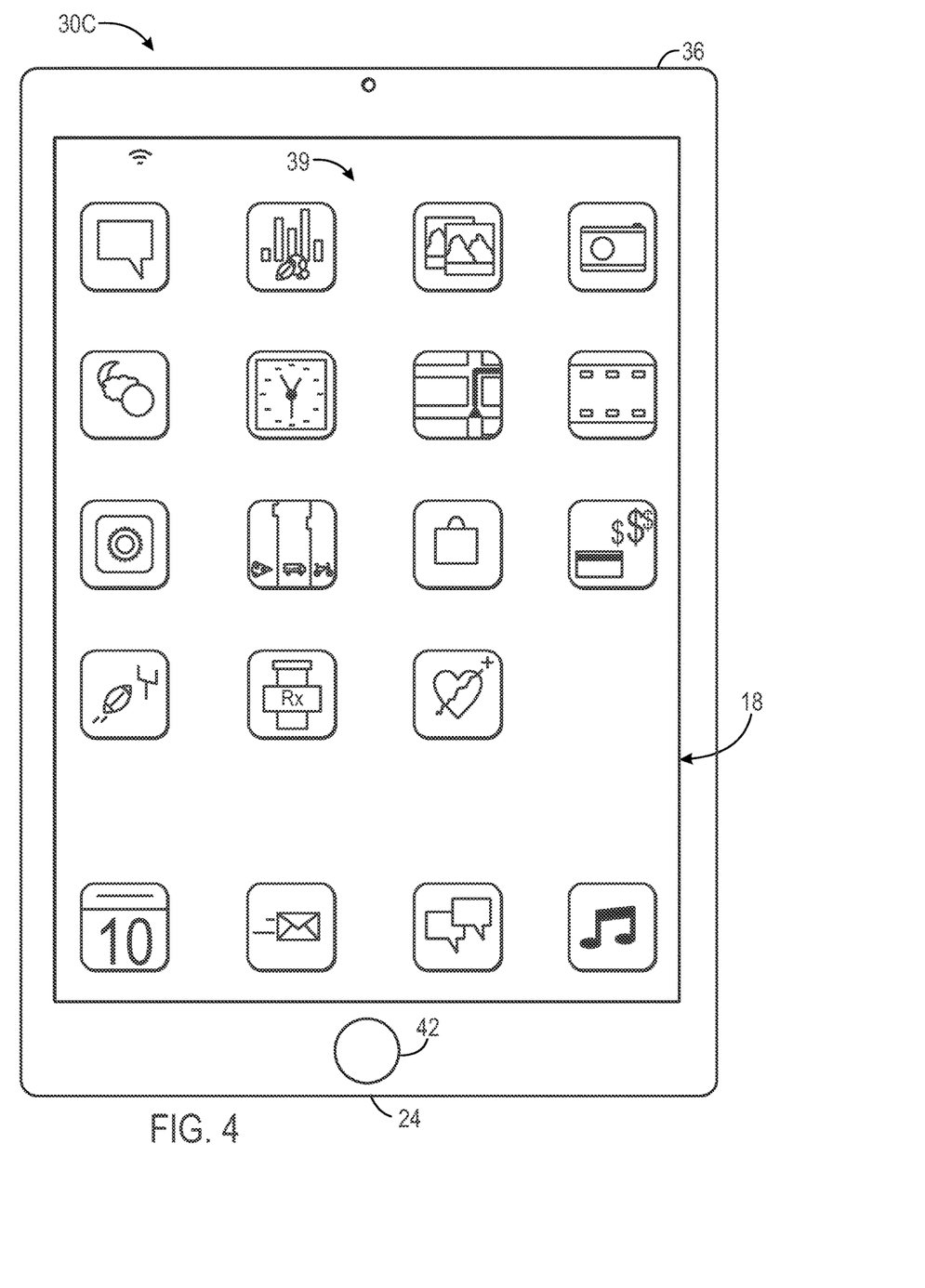
FIG. 4 is a front view of another hand-held device representing another embodiment of the electronic device of FIG. 1.
Figure 5:
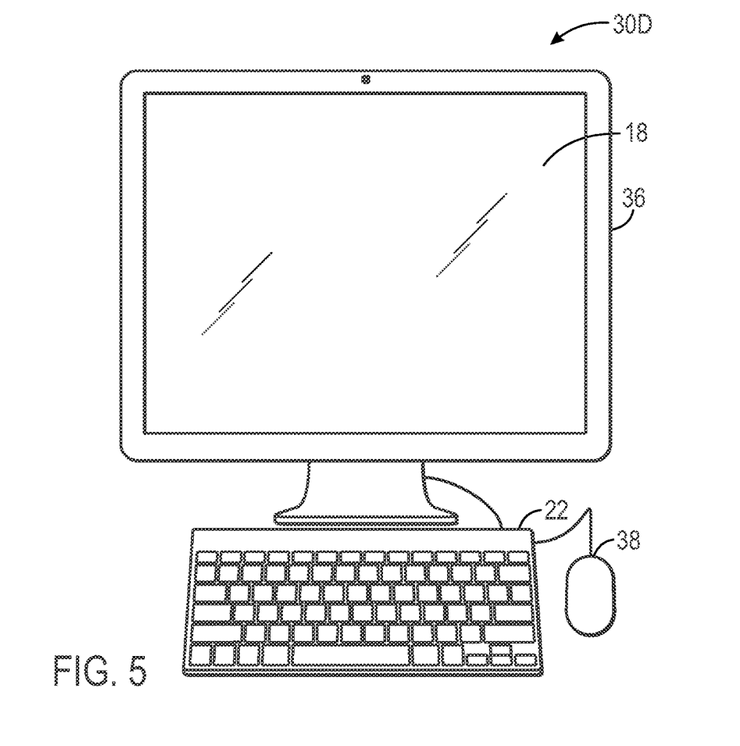
FIG. 5 is a front view of a desktop computer representing another embodiment of the electronic device of FIG. 1.

By way of example, the electronic device 10 may represent a block diagram of the notebook computer depicted in FIG. 2, the handheld device depicted in FIG. 3, the desktop computer depicted in FIG. 4, the wearable electronic device depicted in FIG. 5, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 and/or other data processing circuitry may be operably coupled with the memory 14 and the nonvolatile memory 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the non-volatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interfaces 26. The network interfaces 26 may include, for example, interfaces for a personal area network (PAN), such as a Bluetooth network, for a local area network (LAN) or wireless local area network (WLAN), such as an 802.11x Wi-Fi network, and/or for a wide area network (WAN), such as a $3^{rd}$ generation (3G) cellular network, $4^{th}$ generation (4G) cellular network, or long term evolution (LTE) cellular network. The network interface 26 may also include interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra Wideband (UWB), alternating current (AC) power lines, and so forth.

In certain embodiments, to allow the electronic device 10 to communicate over the aforementioned wireless networks (e.g., Wi-Fi, WiMAX, Mobil WiMAX, 4G, LTE, and so forth), the electronic device 10 may include a transceiver 28. The transceiver 28 may include any circuitry the may be useful in both wirelessly receiving and wirelessly transmitting signals (e.g., data signals). Indeed, in some embodiments, as will be further appreciated, the transceiver 28 may include a transmitter and a receiver combined into a single unit, or, in other embodiments, the transceiver 28 may include a transmitter separate from the receiver. For example, as noted above, the transceiver 28 may transmit and receive signals (e.g., data symbols) to support data communication in wireless applications such as, for example, PAN networks (e.g., Bluetooth), WLAN networks (e.g., 802.11x Wi-Fi), WAN networks (e.g., 3G, 4G, and LTE cellular networks), WiMAX networks, mobile WiMAX networks, ADSL and VDSL networks, DVB-T and DVB-H networks, UWB networks, and so forth. As further illustrated, the electronic device 10 may include a power source 29. The power source 29 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30A, is illustrated in FIG. 2 in accordance with one embodiment of the present disclosure. The depicted computer 30A may include a housing or enclosure 32, a display 18, input structures 22, and ports of an I/O interface 24. In one embodiment, the input structures 22 (such as a keyboard and/or touchpad) may be used to interact with the computer 30A, such as to start, control, or operate a GUI or applications running on computer 30A. For example, a keyboard and/or touchpad may allow a user to navigate a user interface or application interface displayed on display 18.

FIG. 3 depicts a front view of a handheld device 30B, which represents one embodiment of the electronic device 10. The handheld device 34 may represent, for example, a portable phone, a media player, a personal data organizer, a handheld game platform, or any combination of such devices. By way of example, the handheld device 34 may be a model of an iPod® or iPhone® available from Apple Inc. of Cupertino, Calif.

The handheld device 30B may include an enclosure 36 to protect interior components from physical damage and to shield them from electromagnetic interference. The enclosure 36 may surround the display 18, which may display indicator icons 39. The indicator icons 39 may indicate, among other things, a cellular signal strength, Bluetooth connection, and/or battery life. The I/O interfaces 24 may open through the enclosure 36 and may include, for example, an I/O port for a hard wired connection for charging and/or content manipulation using a standard connector and protocol, such as the Lightning connector provided by Apple Inc., a universal service bus (USB), or other similar connector and protocol.

User input structures 42, in combination with the display 18, may allow a user to control the handheld device 30B. For example, the input structure 40 may activate or deactivate the handheld device 30B, the input structure 42 may navigate user interface to a home screen, a user-configurable application screen, and/or activate a voice-recognition feature of the handheld device 30B, the input structures 42 may provide volume control, or may toggle between vibrate and ring modes. The input structures 42 may also include a microphone may obtain a user's voice for various voice-related features, and a speaker may enable audio playback and/or certain phone capabilities. The input structures 42 may also include a headphone input may provide a connection to external speakers and/or headphones.

FIG. 4 depicts a front view of another handheld device 30C, which represents another embodiment of the electronic device 10. The handheld device 30C may represent, for example, a tablet computer, or one of various portable computing devices. By way of example, the handheld device 30C may be a tablet-sized embodiment of the electronic device 10, which may be, for example, a model of an iPad® available from Apple Inc. of Cupertino, Calif.

Turning to FIG. 5, a computer 30D may represent another embodiment of the electronic device 10 of FIG. 1. The computer 30D may be any computer, such as a desktop computer, a server, or a notebook computer, but may also be a standalone media player or video gaming machine. By way of example, the computer 30D may be an iMac®, a MacBook®, or other similar device by Apple Inc. It should be noted that the computer 30D may also represent a personal computer (PC) by another manufacturer. A similar enclosure 36 may be provided to protect and enclose internal components of the computer 30D such as the dual-layer display 18. In certain embodiments, a user of the computer 30D may interact with the computer 30D using various peripheral input devices, such as the keyboard 22 or mouse 38, which may connect to the computer 30D via a wired and/or wireless I/O interface 24.

Figure 6:
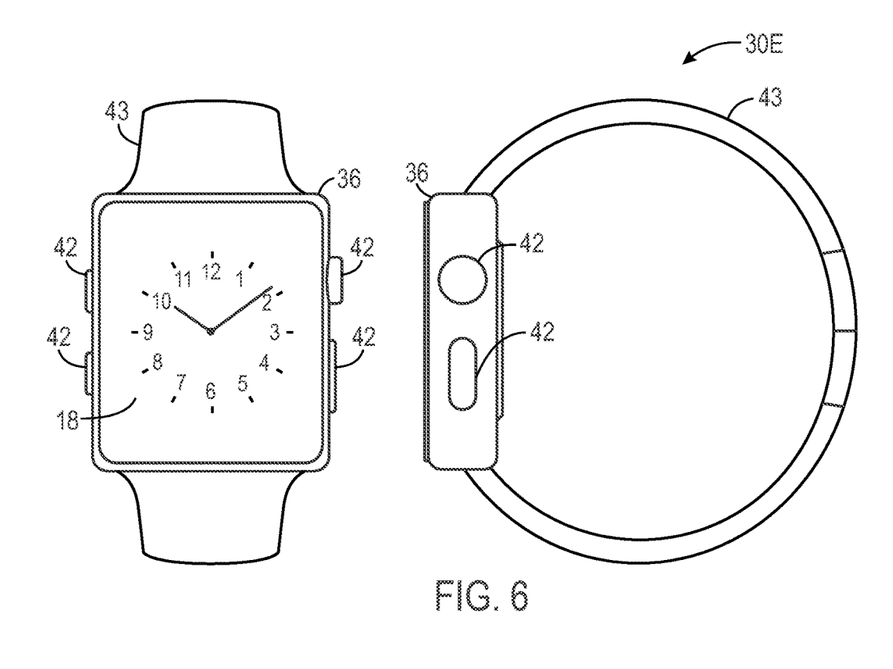
FIG. 6 is a front view of a wearable electronic device representing another embodiment of the electronic device of FIG. 1.

Similarly, FIG. 6 depicts a wearable electronic device 30E representing another embodiment of the electronic device 10 of FIG. 1 that may be configured to operate using the techniques described herein. By way of example, the wearable electronic device 30E, which may include a wristband 43, may be an Apple Watch® by Apple, Inc. However, in other embodiments, the wearable electronic device 30E may include any wearable electronic device such as, for example, a wearable exercise monitoring device (e.g., pedometer, accelerometer, heart rate monitor), or other device by another manufacturer. The display 18 of the wearable electronic device 30E may include a touch screen (e.g., LCD, OLED display, active-matrix organic light emitting diode (AMOLED) display, and so forth), which may allow users to interact with a user interface of the wearable electronic device 30E.

In certain embodiments, as previously noted above, each embodiment (e.g., notebook computer 30A, handheld device 30B, handheld device 30C, computer 30D, and wearable electronic device 30E) of the electronic device 10 may include a transceiver 28, which may include a dynamic Kahn envelope elimination and restoration (EER) polar transmitter (e.g., transmitter 77 as will be discussed with respect to FIG. 8). Indeed, as will be further appreciated, the transmitter may include a modulator (e.g., digital signal processor (DSP), coordinate rotation digital computer (CORDIC) processor) and a dynamic envelope splitter (e.g., DSP) that may be used to extract the information of an incoming in-phase/quadrature (I/Q) component signal (e.g., Cartesian coordinates representation of an incoming data signal), and to determine whether to perform an EER polar modulation of the incoming signal, an I/Q modulation of the incoming signal, or both in conjunction. Indeed, the dynamic envelope splitter may be useful in allowing the transmitter to dynamically switch the transmitter between operating as an EER polar transmitter operating as an I/Q transmitter based on amplitude information (e.g., amplitude and phase information) of the incoming I/Q data signal extracted from the amplitude envelope generated by the polar modulator. In this way, the power efficiency of the transmitter in modulating data signals and/or carrier frequency signals may be markedly increased and maximized. Furthermore, the alignment between amplitude and phase path sensitivity and power amplifier input and output leakage may also be improved utilizing presently disclosed techniques.

Figure 7:
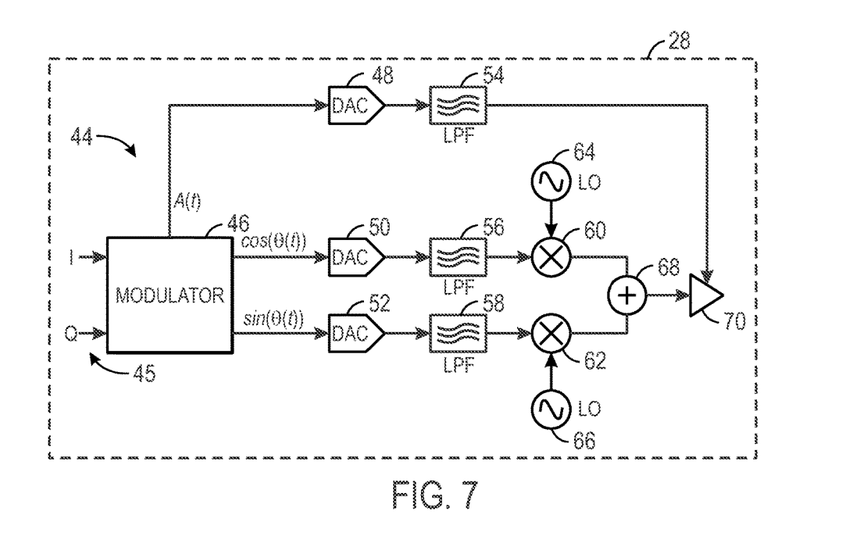
FIG. 7 is a block diagram of a transmitter of the transceiver included within the electronic device of FIG. 1, in accordance with an embodiment.

With the foregoing in mind, FIG. 7 depicts a transmitter 44 that may be included as part of the transceiver 28. Although not illustrated, it should be appreciated that the transceiver 28 may also include a receiver that may be coupled to the transmitter 44. As noted above, and as will be further appreciated with respect to FIG. 8, the transmitter 44 may, in some embodiments, include and operate as an EER polar transmitter, while, in other embodiments, the transmitter 44 may include and operate as Cartesian and/or I/Q transmitter. As depicted, the transmitter 44 may receive a signal 45 that may be modulated via a modulator 46. In certain embodiments, the transmitter 44 may receive a Cartesian coordinate represented signal 45, which may include, for example, data symbols encoded according to orthogonal in-phase (I) and quadrature (Q) vectors. Thus, when the I/Q signal 45 is converted into an electromagnetic wave (e.g., radio frequency (RF) signal, microwave signal, millimeter wave signal), the conversion may be generally linear, as the I/Q signal may be frequency band-limited. However, in other embodiments, the modulator 46 may be used to translate the I/Q vector components of the signal 45 into a polar coordinate representation of the signal 45, in which data symbols may be encoded according to an amplitude component and a phase component.

In certain embodiments, the modulator 46 may include a digital signal processor (DSP) or a coordinate rotation digital computer (CORDIC) that may be used to process the individual Cartesian represented data symbols (e.g., constellations of data symbols) and/or polar amplitude and phase components of the data symbols. The modulator 46 may also include an envelope limiter and/or envelope detector that may extract amplitude and phase information from the I/Q signal 45, and may thus generate a constant amplitude envelope signal A(t) (e.g., which may be expressed as: $\sqrt{I^2+Q^2}$ or $\sqrt{I(t)^2+Q(t)^2}$) in addition to the in-phase (I) signal component (e.g., $\cos(\theta(t))$) and the quadrature (Q) signal component (e.g., $\sin(\theta(t))$), as illustrated. As further depicted in FIG. 7, the transmitter 44 may also include a number of digital-to-analog converters (DACs) 48, 50, and 52 that may be used to respectively convert (e.g., sample) the amplitude envelope signal A(t), the in-phase (I) signal component (e.g., $\cos(\theta(t))$), and the quadrature (Q) signal component (e.g., $\sin(\theta(t))$) of the signal 45 into digital signals or frequency-domain signals. As further illustrated, the amplitude envelope signal A(t) and the I/Q signals 45 (e.g., signals $\cos(\theta(t))$, $\sin(\theta(t))$) may be then respectively passed to low pass filters (LPFs) 54, 56, and 58, which may be provided to pass the low frequency components of the amplitude envelope signal A(t) and the I/Q signals 45 (e.g., signals $\cos(\theta(t))$, $\sin(\theta(t))$) and filter the high frequency components of the signals.

The I/Q signals 45 may be then respectively passed to mixers 60 and 62. The mixers 60 and 62 may be used to respectively mix (e.g., multiply or upconvert) the frequency of the in-phase (I) signal component (e.g., $\cos(\theta(t))$) with the frequency signal of a local oscillator (LO) 64 and the frequency of the quadrature (Q) signal component (e.g., $\sin(\theta(t))$) with the frequency signal (e.g., 90° out of phase oscillation signal) of a LO 66 to generate a carrier frequency and/or radio frequency (RF) signal once summed via a summer 68. The summed in-phase (I) signal component (e.g., $\cos(\theta(t))$) and the quadrature (Q) signal component (e.g., $\sin(\theta(t))$) may then be passed to a power amplifier (PA) 70 (e.g., high power amplifier (HPA), high efficiency power amplifier (HEPA)) to generate an electromagnetic signal (e.g., radio frequency (RF) signal, microwave signal, millimeter wave signal) for transmission (e.g., via an antenna coupled to the transmitter 44). At substantially the same time, the amplitude envelope signal A(t), which, as previously noted, may include a constant amplitude envelope signal (also including signal phase information), may be passed to the PA 70. In certain embodiments, in accordance with the envelope elimination and restoration technique, the amplitude and phase information of the amplitude envelope signal A(t) may be restored to the envelope of the carrier signal and/or RF signal at the input of the PA 70 to modulate, for example, the supply voltage of the PA 70.

However, in certain embodiments, the amplitude envelope amplitude information and the amplitude envelope phase information may include a very wide frequency bandwidth (e.g., an infinite frequency bandwidth) due to certain discontinuities or nonlinearities in phase (e.g., a distortion of π radians or 180° phase shift) when the phase signal approaches or is at the zero crossing (e.g., the zero value axis of a plot of amplitude envelope). Furthermore, even when the amplitude envelope amplitude and phase portions are filtered (e.g., via baseband filtering) in an attempt to track the envelope amplitude and/or phase portions, the filtering may cause the envelope amplitude and/or phase portions to no longer include a constant envelope, and to include undesirable spikes in amplitude at or near the zero crossing. Still further, merely attempting to track the envelope to regulate power efficiency (e.g., $$\eta = \frac{P_{RF}}{P_{DC}} \times 100\%,$$

where η is the power efficiency and P is power) of the amplifier 70, and, by extension, the transmitter 44, may not compensate for power efficiency losses due to the discontinuities, nonlinearities, or other amplitude spikes in the envelope amplitude and/or phase portions. The foregoing may be especially true for transmitters and/or other wireless systems supporting, for example, Bluetooth® Enhanced Data Rate 3.0 (EDR3) or higher.

Figure 8:
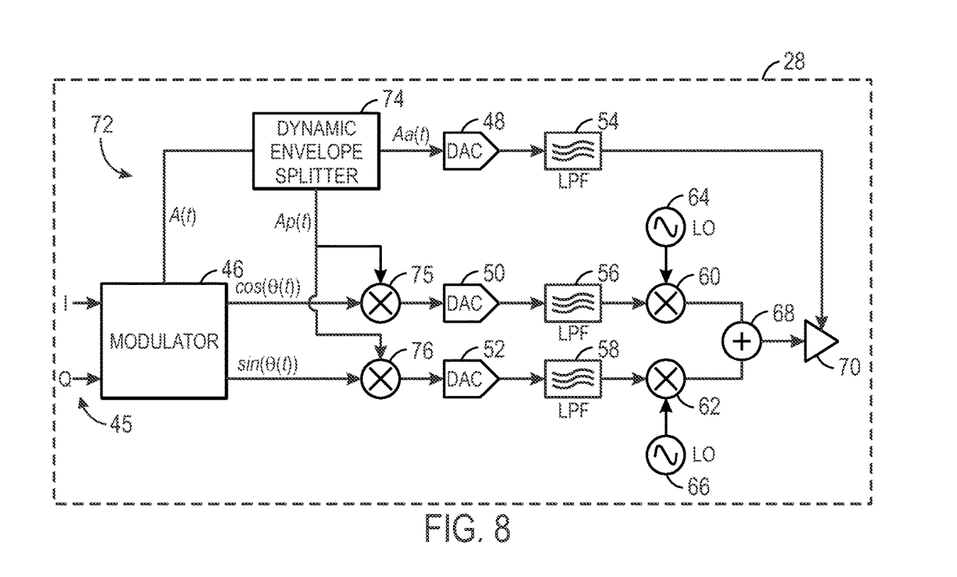
FIG. 8 is a block diagram of the transmitter of FIG. 7 and including a dynamic envelope splitter, in accordance with an embodiment.

Accordingly, in certain embodiments, as illustrated in FIG. 8, it may be useful to provide a dynamic EER polar transmitter 72. As depicted, the dynamic EER polar transmitter 72 may include a dynamic envelop splitter 74, which may itself include a software system, a hardware system, or some combination of hardware and software (e.g., DSP) that may be implemented as part of one or more processing devices or systems included in the transceiver 28. Indeed, in certain embodiments, the dynamic envelop splitter 74 that may be used to split the amplitude envelope signal A(t) into an envelope amplitude portion or subcomponent $A_a(t)$ and an envelope phase portion or subcomponent $A_p(t)$. Specifically, in some embodiments, the amplitude envelope signal A(t) may be expressed as the product of the envelope amplitude portion or subcomponent $A_a(t)$ and the envelope phase portion or subcomponent $A_p(t)$: $A(t)=A_a(t)\cdot A_p(t)$. Thus, as further illustrated, the dynamic envelop splitter 74 may allow the dynamic EER polar transmitter 72 to dynamically switch between operating as an EER polar transmitter and operating as an I/Q transmitter based on, for example, the envelope amplitude portion $A_a(t)$ and/or the envelope phase portion $A_p(t)$ of the amplitude envelope signal $A(t)$.

Figure 9:
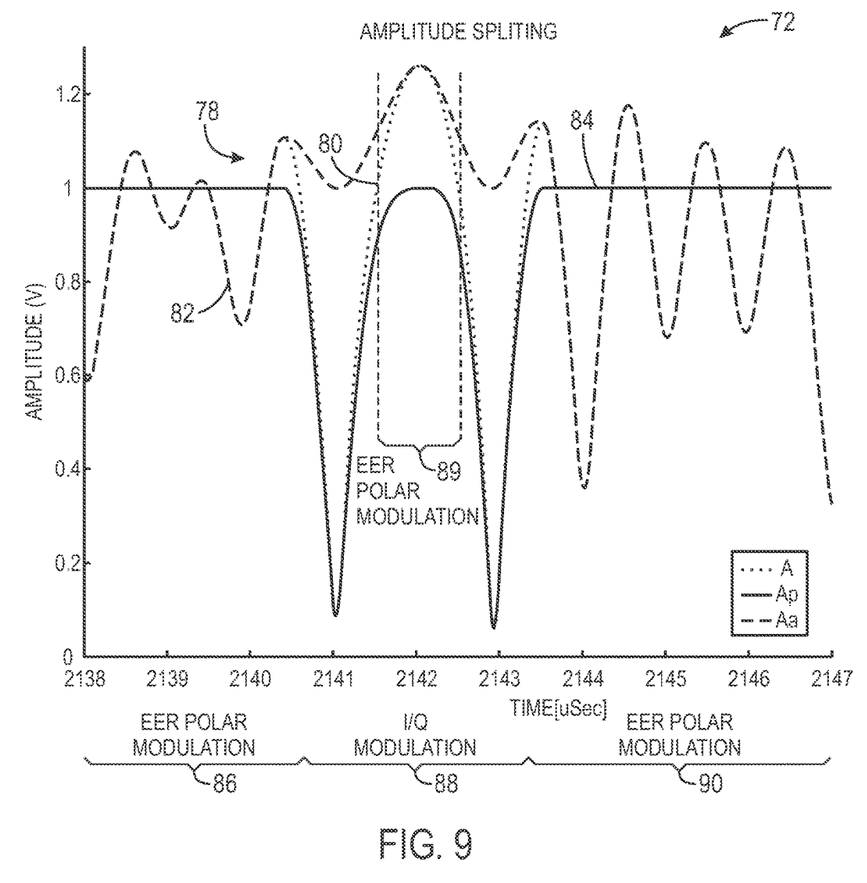
FIG. 9 is a diagram of an amplitude envelope signal, an amplitude portion of the amplitude envelope signal, and a phase portion of the amplitude envelope signal, in accordance with an embodiment.

For example, as will be further appreciated with respect FIG. 9, based on the respective values of the frequency-domain representations of the envelope amplitude portion $A_a$ and/or the envelope phase portion $A_p$, the dynamic EER polar transmitter 72 may operate as an EER polar transmitter, an I/Q transmitter, or both concurrently, to increase and maximize the power efficiency of the dynamic EER polar transmitter 72. These techniques may also markedly improve the alignment between amplitude and phase path sensitivity and power amplifier input and output leakage. Particularly, whenever the envelope phase portion $A_p$ decreases below an amplitude threshold value (e.g., an actual or normalized amplitude voltage value) of approximately 1 volt (V), the dynamic EER polar transmitter 72 may transition from operating as an EER polar transmitter to operating as an I/Q transmitter until a point in time at which the envelope phase portion $A_p$ reverts back to an amplitude value equal to or greater than the threshold amplitude value (e.g., approximately 1V or greater than approximately 1V). At such an instance, the dynamic EER polar transmitter 72 may switch back to operating as an EER polar transmitter. It should be appreciated that the amplitude threshold value may include any predetermined amplitude voltage value.

For example, in certain embodiments, as further illustrated in FIG. 8, when the dynamic EER polar transmitter 72 operates as an I/Q transmitter (e.g., corresponding to a period when $A_p$ decreases to an amplitude value of less than an amplitude threshold value or when $$A_a = \frac{A}{A_p} \approx A),$$

the time-domain representation of the envelope phase portion $A_p(t)$ may be mixed (e.g., multiplied) via mixers 75 and 76 with the in-phase (I) signal component (e.g., $\cos(\theta(t))$) and the quadrature (Q) signal component (e.g., $\sin(\theta(t))$) to shift the phase of the I/Q signals 45 (e.g., signals $\cos(\theta(t))$, $\sin(\theta(t))$) by the envelope phase portion $A_p(t)$. The respective signals may be then respectively passed through the DACs 50 and 52, the LPFs 56 and 58, and the mixers 60 and 62 before being recombined and passed to the PA 70.

Similarly, when the dynamic EER polar transmitter 72 operates an EER polar transmitter, the time-domain representation of the envelope amplitude portion $A_a(t)$, which may be a constant amplitude envelope signal, may be restored to the envelope of the carrier signal and/or RF signal at the input of the PA 70. That is, the dynamic EER polar transmitter 72 may operate as a traditional EER polar transmitter, in which the envelope amplitude portion $A_a(t)$ may be passed through the DAC 48 and the LPF 54 to the PA 70 to modulate the supply voltage of the amplifier 70. In this way, the dynamic EER polar transmitter 72 may constantly transition between operating as an I/Q transmitter and an EER polar transmitter to increase and maximize the power efficiency of the dynamic EER polar transmitter 72, and, by extension, decrease the power consumption of the electronic device 10. Furthermore, as previously discussed, the alignment between amplitude and phase path sensitivity and power amplifier input and output leakage may also be improved utilizing presently disclosed techniques.

Turning now to FIG. 9, a waveform plot 78 illustrating the aforementioned amplitude envelope splitting and dynamic switching techniques as discussed above with respect to FIG. 8 is presented. As depicted, the waveform plot 78 may include respective frequency-domain (e.g., digital domain) representations of an envelope amplitude signal 80 (e.g., "A"), an envelope amplitude portion signal 82 (e.g., "$A_a$"), and an envelope phase portion signal 84 (e.g., "$A_p$"). In certain embodiments, as further illustrated by FIG. 9, the dynamic envelop splitter 74 may track or analyze the envelope (e.g., the bandwidth of the envelope) of the signals 80, 82, and 84. As illustrated, during a period 86, the envelope phase portion signal 84 (e.g., "$A_p$") may be at an amplitude value of less than approximately 1V or other amplitude threshold value, and may correspond to a period at which the dynamic EER polar transmitter 72 may operate an EER polar transmitter.

However, as further illustrated by the waveform plot 78, as the envelope amplitude signal 80 (e.g., "A") and the envelope phase portion signal 84 (e.g., "$A_p$") approaches, for example, the zero crossing (e.g., the origin or the zero value), the very wide frequency band (e.g., infinite frequency band) nature and nonlinear quality of the envelope phase portion signal 84 (e.g., "$A_p$") causes the envelope amplitude signal 80 (e.g., "A") and the envelope phase portion signal 84 (e.g., "$A_p$") to experience the significant decreases in amplitude as illustrated during the period 88. Therefore, during the period 88, the dynamic EER polar transmitter 72 may transition from operating as an EER polar transmitter to operating as an I/Q transmitter in the performance of, for example, the modulation of the I/Q signal 45 as discussed above with respect to FIG. 8. This may also correspond to a time in which the envelope amplitude portion $A_a$ is equal to or greater than approximately 1V or other amplitude threshold value as further illustrated.

In some embodiments, as further depicted by the waveform plot 78, the dynamic EER polar transmitter 72 may continuously and/or concurrently transition between operating as an EER polar transmitter and operating as an I/Q transmitter. For example, during a period 89 in which the envelope amplitude signal 80 (e.g., "A") and the envelope phase portion signal 84 (e.g., "$A_p$") may momentarily increase to the amplitude threshold value (e.g., approximately 1V or just less than approximately 1V), the dynamic EER polar transmitter 72 may transition back to operating as an EER polar transmitter. Then, after the period 89, the dynamic EER polar transmitter 72 may transition again to operating as I/Q transmitter. Indeed, in one or more embodiments, the dynamic EER polar transmitter 72 may operate, in combination, as an EER polar transmitter and an I/Q transmitter.

As further illustrated by the waveform plot 78, once the envelope amplitude signal 80 (e.g., "A") and the envelope phase portion signal 84 (e.g., "$A_p$") passes the zero crossing (e.g., recovers from the dip in amplitude), which corresponds to a period 90, the envelope phase portion signal 84 (e.g., "$A_p$") may return to an amplitude threshold value (e.g., approximately 1V or just less than approximately 1V), and thus the dynamic EER polar transmitter 72 may transition from operating as an I/Q transmitter back to operating as an EER polar transmitter. In this way, the dynamic EER polar transmitter 72 may ensure that the power efficiency of the dynamic EER polar transmitter 72, and, by extension, the power consumption of the electronic device 10 is maximized. This may further provide power efficiency and processing advantages when modulating and/or processing Bluetooth® EDR3 signals that may be unachievable using lesser advanced EER transmitters or even hybrid-EER transmitters. Still further, the present techniques may significantly improve the alignment between amplitude and phase path sensitivity and power amplifier input and output leakage.

Figure 10:
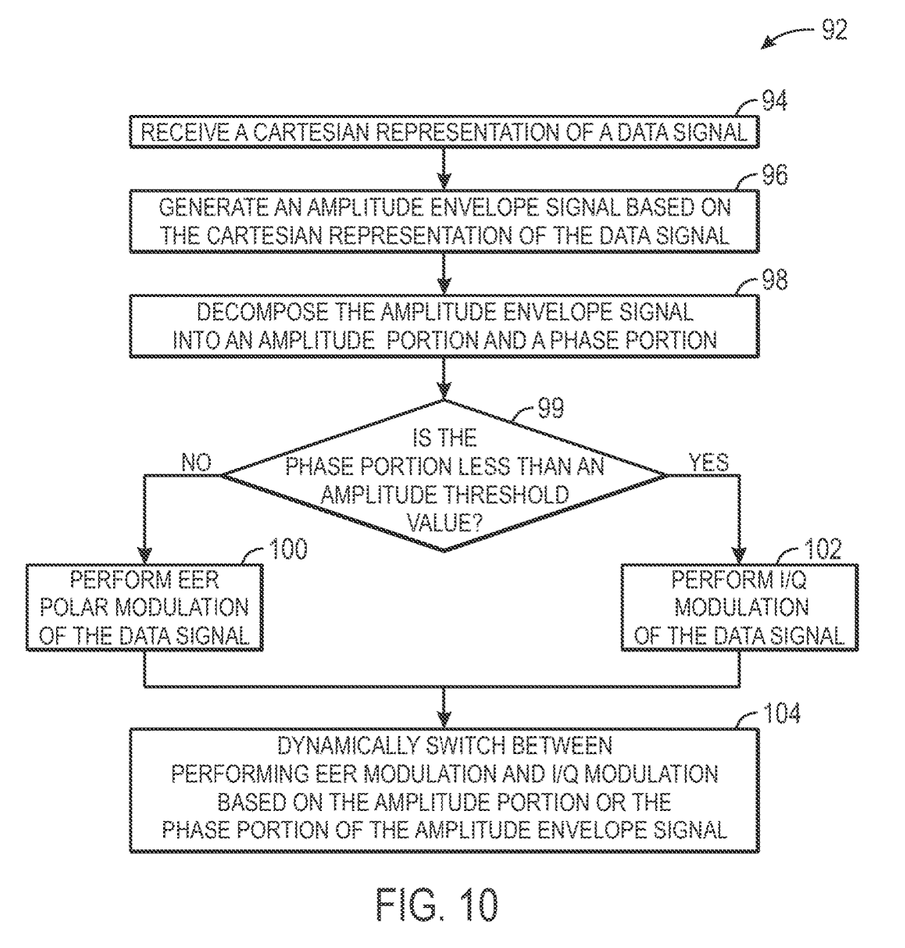
FIG. 10 is a flow diagram illustrating an embodiment of a process useful in dynamically switching between operating as an envelope elimination and restoration (EER) polar transmitter and an in-phase/quadrature (I/Q) transmitter, in accordance with an embodiment.

Turning now to FIG. 10, a flow diagram is presented, illustrating an embodiment of a process 92 useful in increasing power efficiency in I/Q and polar transmitters by dynamically switching between operating as envelope elimination and restoration (EER) polar transmitter and an in-phase/quadrature (I/Q) transmitter using, for example, one or more processors that may be included within the dynamic EER polar transmitter 72 and/or the processor(s) 12 depicted in FIGS. 1 and 8. The process 92 may include code or instructions stored in a non-transitory machine-readable medium (e.g., the memory 14) and executed, for example, by the one or more processor(s) 12 and/or dynamic EER polar transmitter 72. The process 92 may begin with the transmitter 44 receiving (block 94) a Cartesian representation of a data signal. For example, the dynamic EER polar transmitter 72 may receive a Cartesian coordinate represented signal 45, which may include, for example, data symbols or constellations of data symbols encoded according to orthogonal I/Q vectors.

The process 92 may continue with the dynamic EER polar transmitter 72 generating (block 96) an amplitude envelope signal based on the Cartesian representation of the data signal. For example, as previously discussed above with respect to FIG. 7, the modulator 46 of the transmitter 72 may generate a constant time-domain amplitude envelope signal A(t) (e.g., which may be expressed as: $\sqrt{I^2+Q^2}$ or $\sqrt{I(t)^2+Q(t)^2}$). The process 92 may then continue with the dynamic EER polar transmitter 72 decomposing or splitting (block 98) the amplitude envelope signal into an envelope amplitude portion or subcomponent and an envelope phase portion or subcomponent. For example, as noted above, the dynamic EER polar transmitter 72 may include a dynamic envelop splitter 74 that may be used to split the amplitude envelope signal A(t) into an envelope amplitude portion $A_a(t)$ and an envelope phase portion $A_p(t)$.)

The process 92 may then continue with the dynamic EER polar transmitter 72 determining (decision 99) whether the amplitude phase portion is less than an amplitude threshold value. If the amplitude phase portion is not less than the amplitude threshold value, the process 92 may then continue with the dynamic EER polar transmitter 72 performing (block 100) an EER modulation of the data signal. For example, as discussed above with respect to FIGS. 8 and 9, when the envelope phase portion $A_p$ is equal to an amplitude threshold value (e.g., approximately 1V or just less than approximately 1V), the dynamic EER polar transmitter 72 may operate as an EER polar transmitter. On the other hand, if the amplitude phase portion is less than the amplitude threshold value, the process 92 may then continue with the dynamic EER polar transmitter 72 performing (block 102) I/Q modulation of the data signal. For example, whenever the envelope phase portion $A_p$ decreases below an amplitude threshold value (e.g., amplitude value of approximately 1V or just less than approximately 1V), the dynamic EER polar transmitter 72 may transition from operating as an EER polar transmitter to operating as an I/Q transmitter. This may also correspond to a time in which the envelope amplitude portion $A_a$ is equal to or greater than the amplitude threshold value.

The process 92 may then conclude with the dynamic EER polar transmitter 72 dynamically (block 104) switching between performing EER polar modulation and I/Q modulation based on the envelop amplitude portion and/or the envelope phase portion of the amplitude envelope signal. Specifically, as previously noted, the dynamic EER polar transmitter 72 may constantly transition between operating as an EER polar transmitter and an I/Q transmitter as a function of the envelope amplitude portion $A_a(t)$ and/or the envelope phase portion $A_p(t)$ of the amplitude envelope A(t). In this way, by constantly transitioning or switching between operating as an EER polar transmitter and an I/Q transmitter, the dynamic EER polar transmitter 72 may increase and maximize the power efficiency of the dynamic EER polar transmitter 72, and, by extension, decrease the power consumption of the electronic device 10.

Figure 11:
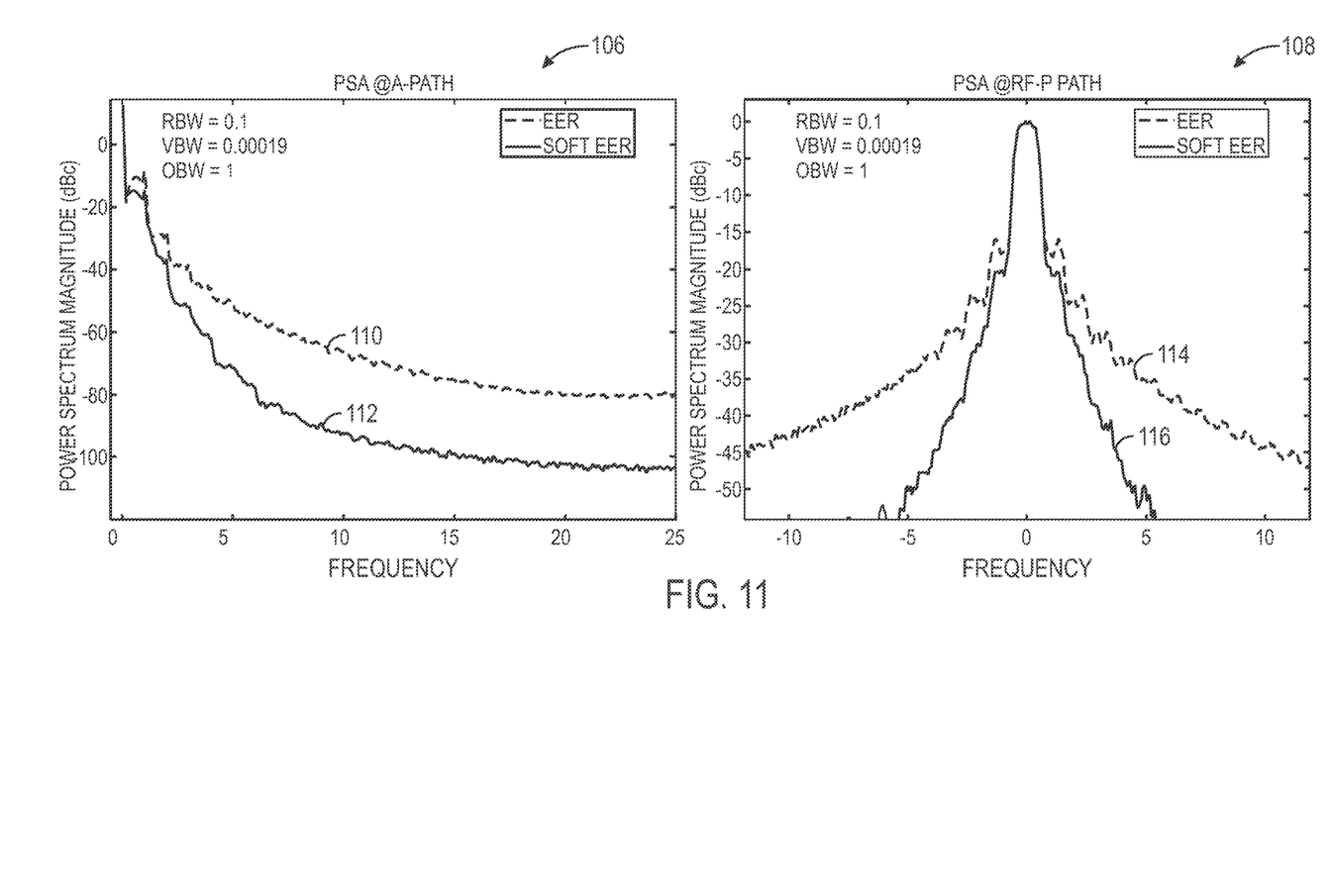
FIG. 11 is a plot diagram illustrating the performance of a dynamic EER polar transmitter as compared to a lesser advanced polar transmitter, in accordance with an embodiment.

FIG. 11 depicts a plot 114, which illustrates the performance of an amplitude plot 106 and a phase plot 108 including amplitude and phase signals 110 and 114 generated without using the presently disclosed amplitude envelope splitting and dynamic switching techniques compared against amplitude and phase signals 112 and 116 generated using the presently disclosed amplitude envelope splitting and dynamic switching techniques. Specifically, the envelope amplitude signals 110 and 112 and the envelope phase signals 114 and 116 are plotted as functions of power spectrum magnitude (dBc) versus frequency. As illustrated by the plot 106, the power spectrum magnitude of the amplitude signal 112 generated via the presently disclosed techniques decreases at a markedly faster rate than the amplitude signal 110, and thus is much more linear as compared to the amplitude signal 110. Similarly, the phase signal 116 generated via the presently disclosed techniques is significantly more linear than the phase signal 114 as each of the phase signals 114 and 116 approaches the zero crossing (e.g., zero value). Thus, the plots 106 and 108 illustrate the increased power efficiency when using the presently disclosed amplitude envelope splitting and dynamic switching techniques.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device, comprising:
  a transmitter comprising:
    a modulator configured to receive an in-phase/quadrature (I/Q) signal and generate an amplitude envelope signal based on the I/Q signal; and
    an envelope splitter configured to decompose the amplitude envelope signal into an envelope amplitude portion and an envelope phase portion, wherein the transmitter is configured to dynamically switch between performing a polar modulation of the I/Q signal and performing an I/Q modulation of the I/Q signal based at least in part on an amplitude value of the envelope phase portion.

2. The electronic device of claim 1, wherein the amplitude envelope signal comprises a function of the I/Q signal.

3. The electronic device of claim 1, wherein the transmitter comprises an I/Q transmitter.

4. The electronic device of claim 1, wherein the transmitter comprises an envelope elimination and restoration (EER) polar transmitter.

5. The electronic device of claim 1, wherein the transmitter is configured to perform the polar modulation of the I/Q signal when the amplitude value is approximately equal to an amplitude threshold value.

6. The electronic device of claim 1, wherein the transmitter is configured to perform the I/Q modulation of the I/Q signal when the amplitude value decreases below an amplitude threshold value.

7. The electronic device of claim 6, wherein the transmitter is configured to switch from performing the I/Q modulation of the I/Q signal to performing the polar modulation of the I/Q signal when the amplitude value returns to the amplitude threshold value.

8. The electronic device of claim 1, wherein the transmitter is configured to dynamically switch between performing the polar modulation of the I/Q signal and performing the I/Q modulation of the I/Q signal to increase a power efficiency of the transmitter.

9. The electronic device of claim 1, wherein the transmitter is configured to support Bluetooth® Enhanced Data Rate 3.0 (EDR3) or higher.

10. A method, comprising:
receiving an in-phase/quadrature (I/Q) representation of a data signal via a dynamic envelope elimination and restoration (EER) polar transmitter;
generating an amplitude envelope signal based on the data signal;
decomposing the amplitude envelope signal into an envelope amplitude subcomponent and an envelope phase subcomponent; and
dynamically switching between performing an EER polar modulation and performing an I/Q modulation of the data signal based at least in part on whether the envelope phase subcomponent is substantially equal to a first amplitude value or a second amplitude value.

11. The method of claim 10, wherein dynamically switching between performing the EER polar modulation and performing the I/Q modulation of the data signal comprises alternating between operating as an EER polar transmitter and operating as an I/Q transmitter.

12. The method of claim 10, wherein performing the EER polar modulation of the data signal comprises performing the EER polar modulation of the data signal only when the envelope phase subcomponent is substantially equal to or greater than an amplitude threshold value as the first amplitude value.

13. The method of claim 10, wherein dynamically switching between performing the EER polar modulation and performing the I/Q modulation comprises alternately switching between performing the EER polar modulation and performing the I/Q modulation over a period of time.

14. A method for increasing a power efficiency of an electronic transmitter, comprising:
receiving an amplitude envelope signal via a processor of the electronic transmitter;
splitting the amplitude envelope signal into an envelope amplitude portion and an envelope phase portion;
controlling the electronic transmitter to operate as a polar transmitter during a first time period;
controlling the electronic transmitter to operate as an in-phase/quadrature (I/Q) transmitter during a second time period, wherein the second time period corresponds to a period in which the envelope phase portion of the amplitude envelope signal approaches a zero crossing; and
controlling the electronic transmitter to revert to operating as the polar transmitter during a third time period.

15. The method of claim 14, wherein receiving the amplitude envelope signal comprises receiving a time-domain amplitude envelope signal expressed as: $A(t)=\sqrt{I^2+Q^2}$ or $A(t)=\sqrt{I(t)^2+Q(t)^2}$, wherein A(t) comprises the amplitude envelope signal, and wherein I comprises an in-phase component of a data signal and Q comprises an quadrature component of the data signal.

16. The method of claim 14, wherein splitting the amplitude envelope signal into the envelope amplitude portion and the envelope phase portion comprises:
transforming the amplitude envelope signal into a digital domain; and
splitting the envelope amplitude portion and the envelope phase portion into a digital domain representation of the envelope amplitude portion and a digital domain representation of the envelope phase portion expressed as: $A=A_a \cdot A_p$.

17. The method of claim 14, wherein controlling the electronic transmitter to operate as the polar transmitter during the first time period comprises controlling the electronic transmitter to operate as an envelope elimination and restoration (EER) polar transmitter during the first time period.

18. The method of claim 14, wherein controlling the electronic transmitter to operate as the I/Q transmitter during the second time period comprises controlling the electronic transmitter to operate as the I/Q transmitter when the amplitude envelope signal approaches the zero crossing.

19. The method of claim 14, wherein controlling the electronic transmitter to operate as the polar transmitter during the first time period comprises controlling the electronic transmitter to operate as the polar transmitter when an amplitude of the envelope phase portion is approximately equal to or greater than a predetermined threshold value.

20. The method of claim 14, wherein controlling the electronic transmitter to operate as the I/Q transmitter during the second time period comprises controlling the electronic transmitter to operate as the I/Q transmitter when an amplitude of the envelope phase portion decreases to a value below a predetermined threshold value.

21. The method of claim 14, wherein controlling the electronic transmitter to revert to operating as the polar transmitter during the third time period comprises controlling the electronic transmitter to operate as the polar transmitter after a point at which the envelope phase portion traverses the zero crossing.

22. An electronic transmitter, comprising:
a modulator configured to receive an in-phase/quadrature (I/Q) signal input and to modulate the I/Q signal input;
a dynamic envelope splitter configured to:
receive an extracted amplitude envelope of the I/Q signal input;
decompose the amplitude envelope into an amplitude subcomponent signal and a phase subcomponent signal;
provide the phase subcomponent signal to a phase path of the electronic transmitter when the phase subcomponent signal comprises an amplitude value equal to a threshold amplitude value as an indication to operate the electronic transmitter as an envelope elimination and restoration (EER) polar transmitter; and provide the amplitude subcomponent signal to an amplitude path of the electronic transmitter when the amplitude subcomponent signal comprises an amplitude value equal to or less than the threshold amplitude value as an indication to operate the electronic transmitter as an I/Q transmitter; and an amplifier configured to generate an electromagnetic signal for transmission based at least in part on the amplitude subcomponent signal or the phase subcomponent signal.

23. The electronic device of claim 22, wherein the threshold amplitude value comprises an amplitude value of approximately 1 volt (V).

24. A non-transitory computer-readable medium having computer executable code stored thereon, the code comprising instructions to:

derive an amplitude envelope based on a received Cartesian coordinate based data signal;

decompose the amplitude envelope into an envelope amplitude portion and an envelope phase portion; and cause a transmitter to alternately transition between computing a polar modulation of the Cartesian coordinate based data signal and computing a Cartesian modulation of the Cartesian coordinate based data signal based at least in part on an amplitude value of the envelope phase portion.

* * * * *